United States Patent [19]

Darrah

[11] 4,056,261

[45] Nov. 1, 1977

[54] RECOVERY OF GOLD AND SILVER FROM MINE-RUN DUMPS OR CRUSHED ORES USING A PORTABLE ION-EXCHANGE CARBON PLANT

[76] Inventor: Robert M. Darrah, P.O. Box "5", Cool, Calif. 95614

[21] Appl. No.: 658,551

[22] Filed: Feb. 17, 1976

[51] Int. Cl.² ............................................... C22B 3/02
[52] U.S. Cl. ................................. 266/101; 75/101 R; 75/118 R; 299/5
[58] Field of Search .......... 75/101 R, 101 BE, 118 R, 75/104; 266/101, 170; 299/5, 7, 16, 17

[56] References Cited

U.S. PATENT DOCUMENTS

| 560,997 | 5/1896 | Hunicke | 75/118 R |
|---|---|---|---|
| 2,545,239 | 3/1951 | McQuiston, Jr. et al. | 75/118 R |
| 2,704,702 | 3/1955 | Pike | 75/101 R |
| 2,829,964 | 4/1958 | Zimmerley et al. | 75/101 R X |
| 3,260,593 | 7/1966 | Zimmerley et al. | 75/104 X |
| 3,639,003 | 2/1972 | Spedden et al. | 299/5 |
| 3,809,430 | 5/1974 | Michaelson et al. | 299/5 |
| 3,840,365 | 10/1974 | Hammes, Sr. et al. | 75/101 R |
| 4,017,309 | 4/1977 | Johnson | 75/101 R |

Primary Examiner—Roy Lake
Assistant Examiner—Paul A. Bell
Attorney, Agent, or Firm—Nolte and Nolte

[57] ABSTRACT

System for recovering at least one of gold and silver from mine run dumps or crushed ores containing at least one of gold and silver, comprising an inclined surface for supporting a heap of the mine run dumps or crushed ores, means for distributing an alkali and cyanide containing aqueous solution onto the heap, a storage zone for the resulting pregnant solution arranged to collect the run-off of the solution from the inclined surface, a plurality of activated carbon loaded ion exchange vessels mounted on mobile support means, conduit means for feeding the pregnant solution serially through the vessels thereby to strip the gold and silver values from the solution and conduit means for recycling resulting barren solution for distribution onto the heap.

4 Claims, 1 Drawing Figure

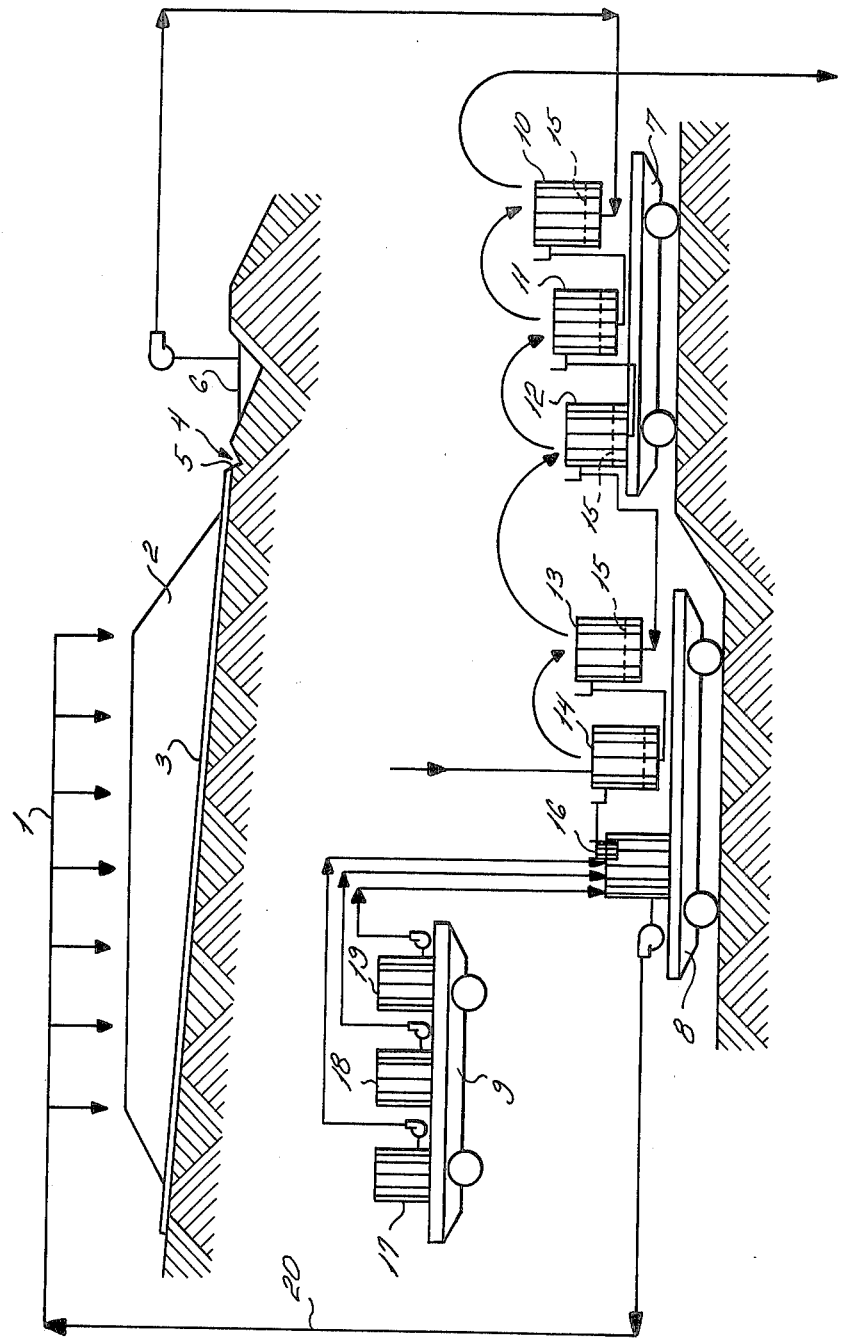

RECOVERY OF GOLD AND SILVER FROM MINE-RUN DUMPS OR CRUSHED ORES USING A PORTABLE ION-EXCHANGE CARBON PLANT

This invention relates to the recovery of gold and silver from mine-run dumps or crushed ores using dilute cyanide solution, liquid caustic, and activated carbon, and provides an improved, low capital and operating cost carbon plant to recover the aqueous gold and silver values.

More specifically, the invention relates to the use of a portable, self-contained carbon ion-exchange plant, mounted on trailers, which can be easily transported and installed for immediate use to recover dissolved gold and silver from leach liquors.

The invention will be more fully understood by reference to a specific embodiment, as illustrated in the drawing, which is a schematic of a process and the apparatus therefor according to the invention.

The illustrated embodiment includes spraying 1 a dilute cyanide and caustic solution on the surface of the mine-run dumps or a crushed ores heap 2 and allowing the solution to slowly percolate through the heap 2 until it encounters the impervious pad 3, constituted of compacted soil or mill fallings for example, under the ore. The natural slope then directs the solution into a collection ditch 4 lined with a suitable membrane such as butyl rubber 5 and the solution flows by gravity to an impervious holding pond 6, also lined with an impervious membrane such as compacted soil or poly-vinyl-chloride (PVC) plastic.

The dissolved gold and silver values (the solution being called "pregnant solution") are pumped to the portable carbon ion-exchange plant which is mounted on three trailers 7, 8 and 9. Each of tanks 10, 11, 12, 13 and 14, mounted on trailers 7 and 8, includes a punch-plate distributor 15 near the bottom of the tank for distributing the solution which is fed to the bottom of the tank and a charge of granular activated carbon for the ion-exchange supported in the tank by the distributor 15. The solution flows upwardly through each tank through the punchplate distributor 15. The upward velocity of the solution keeps the granular carbon in a teetered or expanded state. The activated carbon adsorbs the aqueous gold and silver values. This step is repeated in the series of identical tanks 10, 11, 12, 13 and 14 until the required amount of values has been recovered. To achieve maximum efficiency, the carbon is periodically transferred in the opposite direction of the solution flow. This countercurrent flow effects contact of the highest values of carbon (i.e., carbon having the lesser amount of unused adsorptive capacity) with the solution containing the largest amount of gold and silver. The transfer of carbon can be effected by pumps, screens, or water-eductors. The eductor is preferable, since it may be connected to a double-sequence timer to cycle the carbon transfer automatically on a schedule determined by the operator.

The solution overflowing the launder on the last tank, flows into a safety screen, which removes any "floating carbon", and enters a surge tank 16. Liquid caustic and cyanide are added from respective tanks 17 and 18, using calibrated reagent meters and the barren solution is pumped back to the heap through conduit 20. Fresh, make-up water is usually added from a tank 19 mounted on the trailer 9. However, if serious plant scaling is encountered, it may be prefereable to add make-up water to the pond to allow the resultant carbonate scale to settle in the pond.

A typical "run" for the above described portable carbon plant will vary considerably dependent upon the ore grade and the leach rate of the gold and silver values. However, for purposes of illustration, the following table represents the average results that would be obtained on leaching a low grade gold and silver ore after a thirty day leach cycle.

Sodium hydroxide and sodium cyanide were charged at a rate in the foregoing "run" such that the concentration of sodium hydroxide and sodium cyanide in the spray solution were, respectively, 0.10% and 0.05%. It is to be understood, however, that the concentrations of sodium hydroxide and sodium cyanide used depend upon the particular ore being processed, do not constitute part of the present invention and are within the routine skill of workers in the art. Moreover, as is also well known in the art, strong alkalies other than sodium hydroxide, namely, other alkali metal or alkaline earth metal hydroxides such as potassium hydroxide and calcium hydroxide, and other cyanides, namely, other alkali metal cyanides such as potassium cyanide, or ammonium cyanide can be used.

TYPICAL RUN FOR PORTABLE CARBON PLANT

| Description | Tons (Or Pounds) | Weight % | Oz/Ton Au | Oz/Ton Ag | % Dist. Au | % Dist. Ag | Troy Ounces Au | Troy Ounces Ag |
|---|---|---|---|---|---|---|---|---|
| Unleached Ore | 100,000 | 100 | .06 | .09 | 100 | 100 | 6,000 | 9,000 |
| Spray Solution (Barren) | 50,000 | 50 | nil | nil | nil | nil | nil | nil |
| Heap Effluent (Pregnant) | 45,000 | 45 | .067 | .067 | 50 | 33 | 3,000 | 3,000 |
| Make-up Water and Reagent | 5,000 | 5 | 0 | 0 | 0 | 0 | 0 | 0 |
| Load Carbon Removed in Carbon Tank | (2,000) | .001 | 500 | 500 | 8.3 | 5.5 | 500 | 500 |
| 10 | (4,000) | .002 | 500 | 500 | 16.6 | 11.1 | 1,000 | 1,000 |
| 11 | (4,000) | .002 | 400 | 400 | 13.3 | 8.9 | 800 | 800 |
| 12 | (4,000) | .002 | 200 | 200 | 6.7 | 4.4 | 400 | 400 |
| 13 | (4,000) | .002 | 100 | 100 | 3.3 | 2.2 | 200 | 200 |
| 14 | (4,000) | .002 | 50 | 50 | 1.7 | 1.1 | 100 | 100 |
| Total Carbon | (22,000) | .011 | 273 | 273 | **50.0 | **33.0 | 3,000 | 3,000 |
| Leached Ore After 30 Days | 99,999.8* | 100 | 0.3 | 0.6 | 50 | 67 | 3,000 | 6,000 |

*Approximately 0.2 tons of Au and Ag removed.
**To nearest whole number.

What is claimed is:

1. System for recovering at least one of gold and silver from mine run dumps or crushed ores containing at least one of gold and silver, comprising an inclined surface for supporting a heap of the mine-run dumps or crushed ores, means for distributing an alkali and cyanide containing aqueous solution onto the heap, a storage zone for the resulting pregnant solution arranged to collect the run-off of the solution from the inclined surface, a plurality of activated carbon loaded ion exchange vessels mounted on mobile support means, the activated carbon being supported on a punchplate distributor in each of the vessels, conduit means for feeding the pregnant solution upwardly through the punchplate distributor supporting the activated carbon, the upward velocity of the solution maintaining the carbon in a teetered state and serially feeding the pregnant solution through the vessels thereby to strip the gold and silver values from the solution, and conduit means for recycling resulting barren solution for distribution onto the heap.

2. System according to claim 1, further comprising means for transporting the activated carbon counter-currently to the pregnant solution.

3. System according to claim 1, further comprising respective reservoirs for said alkali and said cyanide mounted on mobile support means, and conduit means for adding said alkali and cynaide to the barren solution prior to distribution of the solution onto the heap.

4. System according to claim 1, in which a reservoir for make-up water is also mounted on mobile support means.

* * * * *